(12) United States Patent
Lunner

(10) Patent No.: US 8,264,349 B2
(45) Date of Patent: Sep. 11, 2012

(54) TIME FOR EAR PILL INTAKE DETERMINED BY NOISE DOSIMETRY IN WEARABLE DEVICES

(75) Inventor: Thomas Lunner, Smørum (DK)

(73) Assignee: Oticon A/S, Smorum (DK)

( * ) Notice: Subject to any disclaimer, the term of this patent is extended or adjusted under 35 U.S.C. 154(b) by 422 days.

(21) Appl. No.: 12/633,347

(22) Filed: Dec. 8, 2009

(65) Prior Publication Data

US 2010/0141439 A1 Jun. 10, 2010

(30) Foreign Application Priority Data

Dec. 8, 2008 (EP) .................................... 08170932

(51) Int. Cl.
*G08B 21/00* (2006.01)
(52) U.S. Cl. ........................................ 340/540; 381/150
(58) Field of Classification Search .................. 340/540
See application file for complete search history.

(56) References Cited

U.S. PATENT DOCUMENTS

| 2004/0185773 | A1 | 9/2004 | Gerber et al. | |
|---|---|---|---|---|
| 2004/0190729 | A1 | 9/2004 | Yonovitz et al. | |
| 2006/0012478 | A1 | 1/2006 | Carmichel | |
| 2007/0078177 | A1* | 4/2007 | Bao .............................. | 514/425 |
| 2007/0214893 | A1 | 9/2007 | Killion | |
| 2008/0118087 | A1 | 5/2008 | Cheyne | |
| 2008/0159547 | A1* | 7/2008 | Schuler et al. .................. | 381/56 |
| 2008/0181442 | A1* | 7/2008 | Goldstein et al. ............. | 381/354 |
| 2009/0284355 | A1 | 11/2009 | Kiran | |

FOREIGN PATENT DOCUMENTS

EP 1 460 769 A1 9/2004

(Continued)

OTHER PUBLICATIONS

J. Scott Armstrong, "Principles of Forecasting: A Handbook for Researchers and Practitioners," 2001, Kluwer Academic Publishers, Norwell, MA.
European Search Report for EP 08170932.1, dated May 28, 2009.
Novelty Search for EP 08170932.1 by Uppdragshuset AB, Stockholm, Sweden, dated Nov. 11, 2008.

(Continued)

*Primary Examiner* — George Bugg
*Assistant Examiner* — Kerri McNally
(74) *Attorney, Agent, or Firm* — Buchanan Ingersoll & Rooney PC

(57) ABSTRACT

The disclosure relates to a portable processing system adapted for being worn by a user and comprising an input transducer for converting an input sound to an electric input signal, and a signal processing unit adapted for processing an SPU-input signal originating from the electric input signal. The disclosure further relates to use of such system and to a method. The object of the present disclosure is to provide an alerting device aiding a user in administering the dose of a hearing protecting agent. The problem is solved in that the signal processing unit comprises a monitoring part for monitoring and determining an accumulated sound dose AccD in the electric input signal from a start time t0 and for generating an alarm output at a threshold time $t_0 + \Delta t_{th}$ when a predefined dose threshold $D_{th}$ is reached, wherein the predefined dose threshold $D_{th}$ is set in relation to a recommended intake of a predefined hearing protecting agent to ensure an intended effect of the hearing protecting agent. An advantage of the present disclosure is that it helps a user to follow a prescribed dose administration scheme. The disclosure may e.g. be used in applications where a user taking hearing protecting medicine is exposed to acoustically different or noisy or loud environments.

21 Claims, 3 Drawing Sheets

FOREIGN PATENT DOCUMENTS

| | | |
|---|---|---|
| EP | 1 981 253 A1 | 10/2008 |
| WO | WO 2008/013866 A2 | 1/2008 |
| WO | WO 2008/095013 A1 | 8/2008 |

OTHER PUBLICATIONS

Richard D. Kopke et al., "NAC for noise: From the bench top to the clinic," Research Paper, ScienceDirect, Hearing Research 226, 2007, pp. 114-125, Elsevier.

* cited by examiner

TIME FOR EAR PILL INTAKE DETERMINED BY NOISE DOSIMETRY IN WEARABLE DEVICES

TECHNICAL FIELD

The present disclosure relates to monitoring of sound dose exposure. The disclosure relates specifically to a portable processing system adapted for being worn by a user. The disclosure furthermore relates to use of a portable processing system, to a method, a data processing system and a computer readable medium.

The subject matter is described in three parts:
1. Recent findings about mechanisms for noise induced hearing loss is reviewed
2. Resent research on agents that may ameliorate hearing loss is reviewed
3. The disclosure proposes to combine these new findings with noise dosimetry in a hearing aid or other wearable equipment with a microphone to produce a warning signal that suggests intake of the hearing protecting agent within a specified number hours.

The disclosure may e.g. be useful in applications such as where a user taking hearing protecting medicine is exposed to acoustically different or noisy or loud environments.

BACKGROUND ART

1. Recent Findings on Mechanisms for Noise Induced Hearing Loss

Research has shown that oxidative stress plays an important role in noise-induced cochlear injury. Acoustic overexposure leads to several cochlear physiological responses. An important mechanism behind noise induced hearing loss is overproduction of ROS, reactive oxygen species ("oxidants"). This leads to mitochondrial injury and loss of hair cells and neurons through inflammatory pathways (Kopke et al., 2007).

2. Resent Research on Agents that May Ameliorate Hearing Loss

New and accumulating data regarding the role of oxidative stress and cochlear cell death are providing a rational mechanism-based approach for preventing and treating noise-induced hearing loss with pharmacologic agents. Recent research shows that a number of antioxidant and cell death inhibiting compounds can ameliorate deafness associated with acoustic trauma. Of importance are vitamins A, C, and E as well as magnesium. One of the most promising agents is N-acetylcysteine (NAC). It addresses many of the known mechanisms of cochlear injury due to acoustic trauma, functioning as an antioxidant, mitochondrial protectant, and necrosis and cell death inhibitor (Kopke et al., 2007).

However, it is of outmost importance that these agents are taken before noise trauma and/or immediately after the noise trauma. The positive effects of e.g. NAC or vitamins decrease dramatically after a few hours.

There are several products marketed as "noise pills", "ear pills" or "hearing protection pills". One of the most promising is called Auraquell™, and is a combination of vitamins A, C, E, and magnesium. The four active ingredients in Auraquell™, each have, according to the manufacturer, a distinct mechanism of action. Vitamins A, C, and E are antioxidants, while magnesium acts as a vasodilator and may have the additional beneficial effect of reducing swelling of the auditory nerve by preventing noise-induced calcium influx. Whereas each individual agent has shown only small protective effects with long-term dosing, the Auraquell™ combination may, according to the manufacturer, reduce noise induced hearing loss (NIHL) when initiating treatment 1 hour prior to noise exposure or immediately after noise exposure.

WO 2008/095013 A1 deals with an acoustic dose system comprising a first device configured to measure sound pressure levels directed to an ear drum and a second device configured to convert the sound pressure levels into a sound pressure level dose, where the second device sends a notification signal to a third device if the sound pressure level dose is larger than a threshold value, the third device being e.g. a computer system, an audio playback device or a communication device.

US 2008159547 deals with a method for monitoring and reporting sound pressure level exposure for a user of a first communication device is implemented in one embodiment when the device measures a sound pressure level (SPL) of the surrounding environment. The device stores at least the SPL measurement in a memory, producing an SPL exposure record, and displays a visual representation of the SPL exposure record on a display screen.

US 2008/0118087 A1 deals with a miniature sound level dosimeter that is less expensive and more user-friendly than conventional sound level dosimeters.

DISCLOSURE OF INVENTION

The idea suggested here is to combine these new findings on hearing protection via antioxidants with noise dosimetry in a hearing aid, or other wearable equipment with a microphone. The idea is to produce a warning signal that suggests intake of the hearing protecting agent within a specified time, e.g. a number hours. The warning signal can be of acoustic or visual or tactile (e.g. vibrator) nature.

Possible means of detecting overexposure to noise could be by using the microphone of a communication device (e.g. a hearing aid), or other equipment including a microphone, and utilize firmware or hardware in the communication device to continuously measure/monitor the noise dose that the person has been exposed to. When the dose ($L_{AT}$ or $L_{eq}$, equivalent continuous sound level, cf. e.g. paragraph 3.9 Definitions of IEC 61672-1) is over a given threshold, a warning signal is produced. Optionally, other short-term measures may be combined/weighted to determine risk for overexposure; this could include peak measures ($L_{peak}$), or short-term A-weighted levels (LdBA), since it is known that short-term exposure to very loud sounds also can produce noise induced hearing loss.

In addition to hearing aids, cellular phones or the like are interesting devices, since they are usually always on, with a possibility for long-term dose exposure measurement. Other relevant devices include e.g. audio selection devices for receiving a number of audio signals and selecting one (or allow the selection of one) and forwarding the selected audio signal (e.g. a telephone call) to a listening device (e.g. a hearing aid) for being presented to a user.

An object of the present application is to provide an alerting device aiding a user in administering the dose of a hearing protecting agent.

Objects of the application are achieved by the invention described in the accompanying claims and as described in the following.

An object of the application is achieved by a portable processing system adapted for being worn by a user and comprising an input transducer for converting an input sound to an electric input signal, and a signal processing unit adapted for processing an SPU-input signal originating from the electric input signal. The signal processing unit comprises a monitoring part for monitoring and determining an accumulated sound dose AccD in the electric input signal from a start time $t_0$ and for generating an alarm output at a threshold time $t_0+\Delta t_{th}$ when a predefined dose threshold $D_{th}$ is reached, wherein the predefined dose threshold $D_{th}$ is set in relation to a recommended intake of a predefined hearing protecting agent to ensure an intended effect of the hearing protecting agent.

An advantage of the present application is that it helps a user to follow a prescribed dose administration scheme. This is especially advantageous when a user is exposed to acoustically variable environments.

The term 'SPU-input signal' is used to designate an input signal to the signal processing unit (SPU) as an alternative to using a term like 'a first input signal'.

In an embodiment, the sound dose is the sound pressure level dose, e.g. measured as accumulated equivalent continuous sound level $L_{eq}$. The predefined dose threshold $D_{th}$ is then termed $D(Leq)_{th}$.

In an embodiment, 'a recommended intake of a predefined hearing protecting agent to ensure an intended effect of the hearing protecting agent' is as specified by a medically qualified person, such as a doctor, or as specified by a recommended dose administration following the specific hearing protecting product in question, e.g. as prescribed in an insert following the packaged product. In a particular embodiment, the system is adapted to—at a predefined time $\Delta t_{pd}$ in advance of reaching the predefined dose threshold—estimate said threshold time $t_0+\Delta t_{th}$ and to generate an alarm output at said predefined time $t_0+\Delta t_{th}-\Delta t_{pd}$. In an embodiment, the system is adapted to repeat the alarm output after said predefined time, e.g. at certain time intervals, e.g. every 10 minutes.

In a particular embodiment, the system is adapted to allow a user to set the predefined time $\Delta t_{pd}$, e.g. within a predefined limit. In an embodiment, $\Delta t_{pd}$ is limited to be within a specific fraction of the estimated threshold time $e-t(D_{th})=t_0+e-\Delta t_{th}$, e.g. less than 50%, such as less than 25% of the estimated threshold time (to allow a reasonable confidence level of the estimate).

In a particular embodiment, the system is adapted to allow a user to reset the start time $t_0$ and set the accumulated sound dose AccD to 0. This provides that the measurement can be restarted (e.g. after an appropriate intake of an intended dose of a hearing protecting medication) in preparation for a new measurement cycle.

In a particular embodiment, the system is adapted to allow a user to set the predefined dose threshold $D_{th}$. This has the advantage of allowing an adaptation of the dose measurement to a specific situation or a specific hearing protecting agent or a change of the dose administration of the agent (e.g. to adapt to a larger or smaller dose per intake).

In a particular embodiment, the microphone is located in a (physically) separate device from the signal processing unit, the two devices being wired or wirelessly electrically connected. The term 'physically separate devices' is taken to mean that each device has its own dedicated housing and that the devices are either not physically connected or physically connected by a releasable connecting mechanism, e.g. an electrical (and/or mechanical, e.g. acoustical) connector. In an embodiment, the two devices are distinct, physically separate parts that only cooperate electromagnetically via a wireless (e.g. near-field, e.g. inductive, or far-field (radiated)) connection between them. In an embodiment, no wired connections (or connectors) exist between the two devices. This has the advantage of providing an increased flexibility (e.g. in the positioning of the microphone picking up the sound to be monitored, without necessarily compromising other properties of the device, e.g. a directional microphone system of a listening device, such as a hearing aid). Also a modular scheme may be adapted, where the dose meter is an add-on module to a particular communication device or to a number of different devices.

In a particular embodiment, the microphone is an existing part of a communications device, such a mobile telephone or a listening device, such as a hearing aid.

In a particular embodiment, the system is adapted to provide that the signal processing unit provides a processed output signal for being presented to the user.

In a particular embodiment, the system comprises an output transducer, e.g. a receiver, for converting a processed electric output signal, e.g. including alarm or warning outputs, to an output sound adapted for being presented to a user. In an embodiment, an alarm or warning output is presented to the user as a spoken message or as an associative sound (i.e. a sound associated by the user with the meaning of the alarm or warning). In a particular embodiment, the output transducer is an existing part of a communications device, such a mobile telephone or a listening device, such as a hearing aid. In an embodiment, the output transducer comprises a receiver (speaker) of an ordinary hearing aid. Alternatively, the output transducer comprises an electrode of a cochlear implant or a vibrator of a bone conducting hearing aid. In an embodiment, the portable processing system comprises a an ordinary hearing aid (comprising a receiver/speaker as output transducer), a cochlear implant or a bone conducting hearing aid, an active ear protection device, an earphone, a headset or a combination thereof.

In a particular embodiment, the system comprises a visual interface for presenting processed information, e.g. including alarm or warning outputs, to the user and/or for aiding a user to chose appropriate settings, the visual interface e.g. comprising a display, e.g. in combination with one or more input keys. In a particular embodiment, the visual interface is an existing part of a communications device, such a mobile telephone or an audio selection device or a remote control device, such as e.g. for a hearing aid. Alternatively or additionally, the system comprises a tactile user interface, e.g. comprising one or more distinct vibrational messages (optionally having different duration in time), e.g. a relatively slow vibration for the first alarm indicating the there is an estimated time $\Delta t_{pd}$ until a predefined dose threshold $D_{th}$ is reached, and a relatively fast vibration for warnings that the time for reaching the predefined dose threshold $D_{th}$ is approaching (the rate of vibration and/or its extension in time being optionally increased as $t(D_{th})$ is approaching).

In a particular embodiment, the system is adapted to provide that the alarm output is indicative of the estimated time $\Delta t_{pd}$ until a predefined dose threshold $D_{th}$ is reached. This has the advantage that the user gets a warning that he or she has to take the medication in an estimated time $\Delta t_{pd}$ from the time of the alarm output. The prediction of the time for reaching the dose threshold $D_{th}$ from the accumulated dose accDose(t) at a given point in time may be based on any common forecast technique (e.g. Armstrong, 2001) including e.g. time series methods (moving average, exponential smoothing, extrapolation, linear prediction, trend estimation, growth curve), or causal methods (regression analysis, autoregressive moving average (ARMA), autoregressive integrated moving average (ARIMA).

In a particular embodiment, the system is adapted to provide that the currently estimated rest-time $(e-t(D_{th})-t_{current})$ until a predefined dose threshold $D_{th}$ is reached can be presented to a user on request. This provides an increased flexibility for the user to estimate the time for the next intake of the medication and thus a better chance of planning other activities.

In a particular embodiment, the system is adapted to provide that other parameters than sound pressure level dose are alternatively or additionally monitored. In an embodiment peak measures ($L_{peak}$), and/or short-term A-weighted levels ($L_{dBA}$) are monitored and stored for consideration in the estimate of the recommended time for intake of a predefined hearing protecting agent.

$L_{peak}$: Transients of very short duration (above e.g. 140 dB SPL) may cause hearing loss after only one or a few transients (e.g. gun shots), therefore another dose measure is needed for this type of input. In an embodiment, the number of discrete times $L_{peak}$ is above a threshold value ($D(Lpeak)_{th}$) is used as the peak dose measure.

$L_{dBA}$: Intense sounds (above ca 125 dB SPL for a few minutes) during of short duration may cause hearing loss. Therefore another dose measure is needed for this type of input. When the short-time integrated value of $L_{dBA}$ is above a threshold value ($D(LdBA)_{th}$) this value is used as the short-term dose measure.

In a particular embodiment, the system is adapted to provide that the monitored parameters are weighted according to a predefined scheme to determine a risk for overexposure. In an embodiment, the total accumulated dose AccD(Total) is a linear combination of the a number of dose measures, e.g. AccD(Total)=a*AccD(Leq)+b*AccD(Lpeak)+c*AccD(LdBA), where a, b and c are constants, e.g. a=b=c=1/3 or some other values in dependence of the acoustical environment and/or the particular person (male, female, child, age, symptoms, etc.) and/or the particular hearing protection agent in question. In an embodiment, a threshold dose $D(Total)_{th}$ of the accumulated total dose is taken to be reached, if at least one of the accumulated doses exceeds its corresponding threshold dose (here if $AccD(Leq) \geq D(Leq)_{th}$, or $AccD(Lpeak) \geq D(Lpeak)_{th}$ or $AccD(LdBA) \geq D(LdBA)_{th}$).

In a particular embodiment, the portable processing system comprises a communication device, such as a listening device, such as a hearing aid, a headset, an earphone, an active ear protection device, an intermediate device between an audio source and a listening device, such as a remote control or an audio selection device, or a mobile telephone.

In a particular embodiment, the portable processing system comprises an audio selection device and a hearing aid. In an embodiment, the microphone and/or the monitoring unit is/are situated in the audio selection device. In an embodiment, the audio selection device is adapted for receiving a number of audio signals from a number of audio sources (incl. from a mobile telephone or from an entertainment device, e.g. a music player) and for allowing the selection of one of the audio signals and transmitting the selected audio signal to a listening device, e.g. a hearing aid, worn by the user.

In an embodiment, the portable processing system is adapted to provide that the transmission between two parts of the system, e.g. a part comprising a microphone and a dose meter and a part comprising a listening device, e.g. a hearing aid (cf. e.g. FIG. 3), is wireless, and e.g. based on inductive communication. In an alternative embodiment, the portable processing system is adapted to provide that the transmission between such two parts of the system is wired, e.g. via an electrical connector. Alternatively the part comprising the dose meter may take the form of a click on-module adapted for being readily electrically connected to a listening device, e.g. a hearing aid (e.g. like an FM-shoe).

In an embodiment, the monitoring of noise dose is adapted to comply with health and safety regulations such as e.g. the EU Directive 2003/10/EC or the US OSHA rules (OSHA=Occupational Safety and Health Act of 1970).

Use of a portable processing system as described above, in the section on 'mode(s) for carrying out the invention' or in the claims, is furthermore provided by the present application.

A method of aiding a person administering a drug for relieving noise induced hearing loss is furthermore provided, the method comprising Providing a portable processing system adapted for being worn by a user and comprising an input transducer for converting an input sound to an electric input signal, and a signal processing unit adapted for processing an SPU-input signal originating from the electric input signal, Providing a monitoring part for monitoring and determining an accumulated sound dose AccD in the electric input signal from a start time $t_0$ and Providing that an alarm is generated and presented to the person at a threshold time $t_0+\Delta t_{th}$ when a predefined dose threshold $D_{th}$ is reached, Providing that the predefined dose threshold $D_{th}$ is set in relation to a recommended intake of a predefined hearing protecting agent to ensure an intended effect of the hearing protecting agent.

It is intended that the structural features of the system described above, in the detailed description of 'mode(s) for carrying out the invention' and in the claims can be combined with the method, when appropriately substituted by a corresponding process. Embodiments of the method have the same advantages as the corresponding systems.

In a particular embodiment, the method comprises e) providing—at a predefined time $\Delta t_{pd}$ in advance of reaching the predefined dose threshold—estimating said threshold time $t_0+\Delta t_{th}$ and generating an alarm output to said person at said predefined time $t_0+\Delta t_{th}-\Delta t_{pd}$.

A tangible computer-readable medium storing a computer program comprising program code means for causing a data processing system to perform at least some of the steps (such as at least the second, third and fourth steps) of the method described above, in the detailed description of 'mode(s) for carrying out the invention' and in the claims, when said computer program is executed on the data processing system is furthermore provided by the present application. In addition to being stored on a tangible medium such as diskettes, CD-ROM-, DVD-, or hard disk media, or any other machine readable medium, the computer program can also be transmitted via a transmission medium such as a wired or wireless link or a network, e.g. the Internet, and loaded into a data processing system for being executed at a location different from that of the tangible medium.

A data processing system comprising a processor and program code means for causing the processor to perform at least some of the steps (such as at least the second, third and fourth steps) of the method described above, in the detailed description of 'mode(s) for carrying out the invention' and in the claims is furthermore provided by the present application.

Further objects of the application are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The application will be explained more fully below in connection with a preferred embodiment and with reference to the drawings in which.

The figures are schematic and simplified for clarity, and they just show details which are essential to the understanding of the disclosure, while other details are left out. Throughout, the same reference numerals are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

MODE(S) FOR CARRYING OUT THE INVENTION

Possible means of providing the warning signal could be by providing the hearing aid, cellular phone or other device comprising a microphone with an audible signal that signals that it is time to take the ear pill within a predefined time period. Other means of acknowledging the need for ear pills could be a visual display in a cellular phone or a visual display in an audio selection device or a tactile input.

The dosimeter functions and the generation of alarm or warning signals are preferably implemented as software (e.g. firmware) in the hearing aid or as third-party software in the wearable device. Operating systems for mobile devices, such as for example Symbian™ and Windows Mobile™, include possibilities for third-party software development.

Figure 1A:
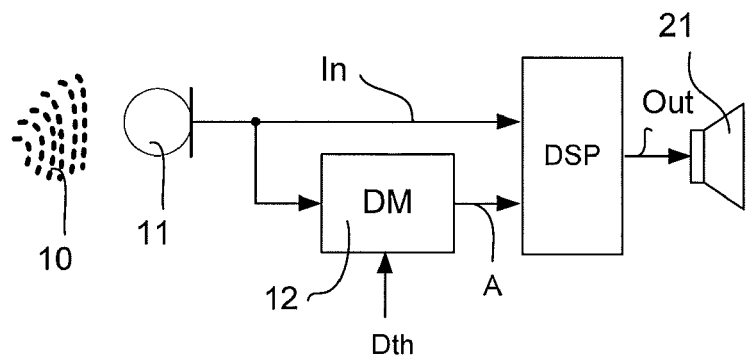
FIG. 1 shows various embodiments of a portable processing system, the embodiment of FIG. 1a shows a portable processing system, the embodiment of FIGS. 1b and 1c being partitioned in physically separate bodies and comprising transceivers for mutual wireless communication.
Figure 1B:
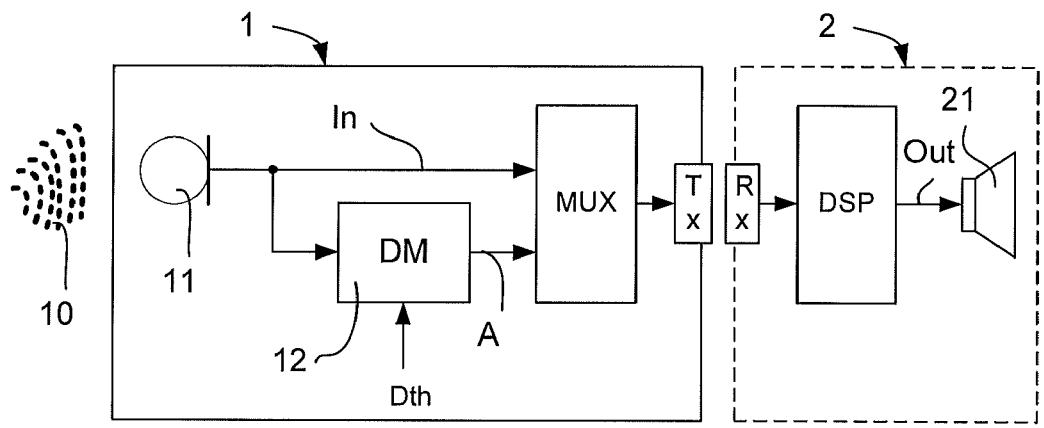
Figure 1C:
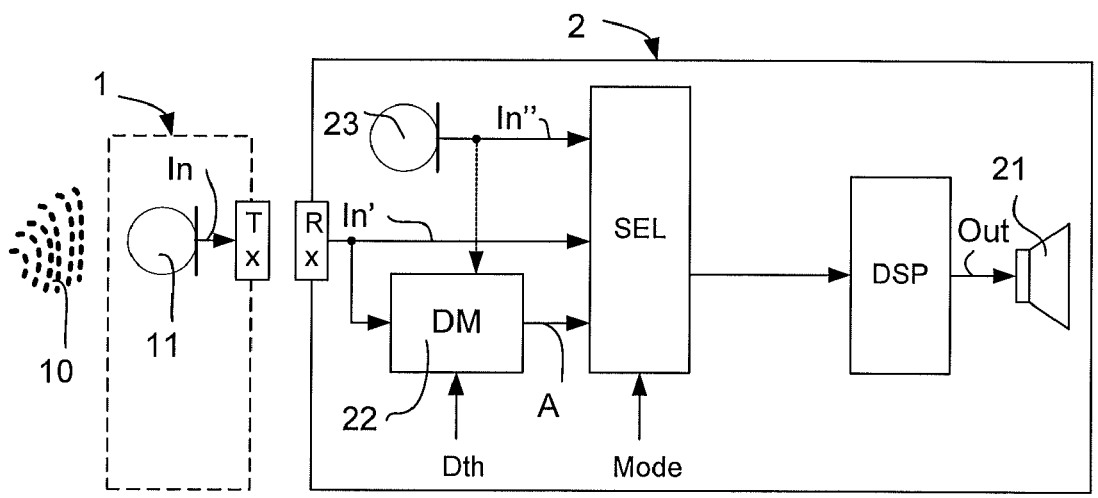

FIG. 1 shows various embodiments of a portable processing system, the embodiments of FIGS. 1b and 1c being partitioned in physically separate bodies and comprising transceivers for mutual wireless communication.

FIG. 1a shows a portable processing system comprising a microphone 11 for picking up sound signals 10 and converting them to an electrical input signal In (possibly digitized by an analogue to digital (AD) converter). The electrical input signal In is fed to a dose meter (DM) unit 12 for monitoring and storing the accumulated dose of the input signal as well as to a signal processing unit (DSP). The dose meter unit 12 gets an input Dth being a measure of a predefined dose threshold. An output alarm signal A, is generated and fed to the signal processing unit, when the dose meter unit 12 has determined that the accumulated dose AccD has reached or exceeded the predefined dose threshold Dth. The alarm signal is propagated to a user of the system (possibly after further processing in the signal generator) via the receiver 21. The output signal Out from the signal processing unit represents under normal circumstances (when the accumulated dose is below the dose threshold) a processed version of the electric input signal In, e.g. providing a frequency dependent gain, e.g. adapted to a particular user's needs. When an alarm or a warning signal is issued from the dose meter unit 12 (or generated in the signal processing unit (DSP) based on a signal from the dose meter unit), the output signal Out from the signal processing unit comprises the (possibly processed) alarm signal. The alarm or warning signal is e.g. either multiplexed or added to the normal processed output signal from the signal processing unit or presented alone while the 'normal' signal is suppressed. In an embodiment, the portable processing system comprises or is embodied in a listening device, such as a headset or a hearing instrument, where the above mentioned elements are normal elements of such device, the dose meter unit being a part of a signal processing unit the device, the functionality of the dose meter being e.g. implemented in software. The input specifying the dose threshold $D_{th}$ may e.g. be a fixed value set from the manufacturer (e.g. reflected in different otherwise identical products having different $D_{th}$-values). Alternatively, it may be a user configurable input (e.g. provided via a remote control unit or specified during a procedure of customizing the device to a particular user, e.g. in a fitting procedure of a hearing instrument). Other functional units may be included in the portable processing system, such as an acoustic feedback reduction system.

FIG. 1b shows an embodiment of a portable processing system according to the disclosure comprising the same elements as shown and described above in connection with FIG. 1a. The embodiment of a portable processing system sown in FIG. 1b is partitioned in two physically separate devices adapted for being in communication with each other, e.g. via cable or mutually corresponding electrical connectors (e.g. of the plug and socket-type) or via transceivers (Tx, Rx in FIG. 1b) for establishing a wireless link between the devices. The wireless link may be based on electromagnetic fields (near-field or far-field), e.g. an inductive or capacitive coupling between the two parts of the device. The connection may be one-way or two way, but at least one-way from the part comprising the input transducer 11 to the part comprising the output transducer 21. The first part of the embodiment of a portable processing system shown in FIG. 1b comprises the microphone 11 and the dose meter unit 12. The first part further comprises a combiner unit (MUX) receiving the electrical input signal In and the output signal A from the dose meter unit (DM) 12 and providing a combined output, which is transmitted via transmitter unit Tx to the second part comprising receiver unit Rx, the signal processing unit (DSP) and the output transducer 21. The combiner unit (MUX) may be an adder that adds the two input signals to a resulting output signal or it may be a selector that selects one of the two input signals (e.g. the output from the dose meter unit having a preference) or it may be a multiplexer that mixes the inputs according to a predefined time slot allocation scheme. Alternatively, it may be a weighting unit weighting the inputs according to a predefined or dynamic scheme and providing a weighted output.

FIG. 1c shows another embodiment of a portable processing system according to the disclosure comprising another partition of the system shown in FIG. 1a in two physically separate devices adapted for being in communication with each other. The first part of the embodiment of a portable processing system shown in FIG. 1b comprises the microphone 11 and a transmitter unit Tx for transmitting the electrical input signal In from the microphone 11 to the second part. The second part comprises receiver unit Rx for receiving the signal transmitted from transmitter Tx of the first part. The receiver unit outputs electrical input signal In', which is fed to dose meter 12 and a combiner unit (SEL). The second part further comprises a further microphone unit 23 whose output In" is also fed to the combiner unit (SEL). The electrical input In" to the combiner unit may represent an additional input signal for being evaluated by the dose meter (as indicated by the dashed input to the dose meter unit), e.g. from an alternatively located microphone to ensure a more complete picture of the acoustic dose. Alternatively or additionally, the electrical input signal In" may represent the output of an ordinary microphone system (e.g. the output of a directional microphone system, e.g. of a hearing instrument), which is used by the portable processing device (e.g. by the signal processing device) to create an output signal representative of the input sound, e.g. adapted to a particular user's needs (such as e.g. in a hearing instrument). The combiner unit (SEL) is controlled via a control input MODE. In an embodiment the combiner unit takes the form of a selector, where one of the inputs can be selected as an output via control input MODE. Alternatively, the combiner unit may be a weighting unit. The output of the combiner unit (SEL) is fed to the signal processing unit (DSP) for processing.

FIG. 2 shows two embodiments of a portable processing system according to the disclosure, each comprising a user interface allowing a user to set processing parameters and receive processed information.

Figure 2A:
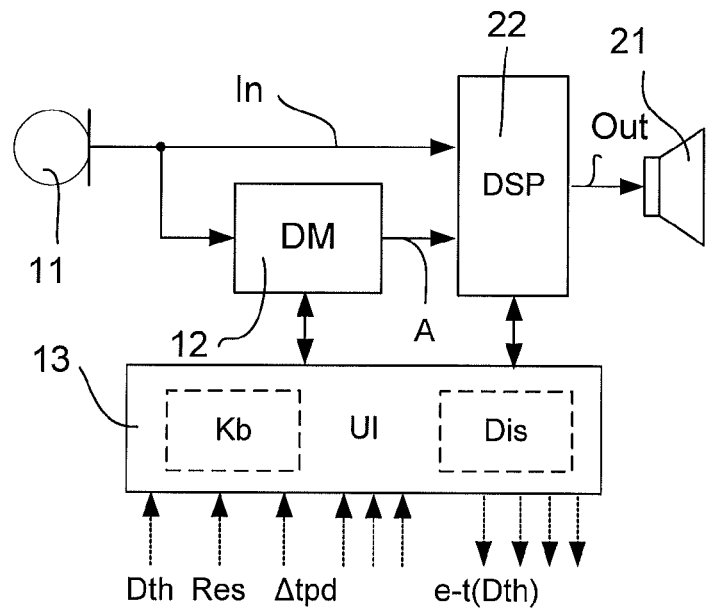
FIG. 2 shows two embodiments of a portable processing system according to the disclosure, each comprising a user interface allowing a user to set processing parameters and receive processed information.

FIG. 2a shows an embodiment of a portable processing system according to the disclosure comprising the same elements as shown and described above in connection with FIG. 1a. It further comprises a user interface (UI) 13. In embodiments of the disclosure, the user interface comprises solely a number of keys or solely a number of visual indicators (e.g. LEDs), e.g. a display, e.g. a touch screen, or a combination of keyboard and display as shown in FIG. 2a. The user interface 13 in FIG. 2a comprises a keyboard (Kb) and a display (Dis). The keyboard may take on any form appropriate for the practical application. It may e.g. comprise a full keyboard as found on a laptop or a PC or it may comprise a limited keyboard as e.g. found on a mobile telephone, or it may comprise a limited number of dedicated functional buttons. The keyboard may be implemented in any convenient way, e.g. as push buttons or keys or as activators on a touch screen. The display may take the form of electronic display, e.g. an LCD or other electronic display (e.g. a touch screen) adapted to a portable electronic device (such as a mobile telephone or a remote control, etc.), i.e. typically optimized to have a relatively low power consumption. Via the user interface a user may input data into the portable processing system, such as values of parameters $D_{th}$ indicating a predefined dose threshold (where a medication has to be taken by the user) and $\Delta$tpd indicating a predefined time in advance of reaching the predefined dose threshold $D_{th}$ (where a medication can be taken by the user or where the accumulated dose is approaching its threshold value and should be regularly checked). The input of values for input parameters can be made either by predefined buttons or the keyboard alone or in combination with the display (either as predefined selectable values of freely settable). Selectable and selected values of input parameters as well as processed values of present accumulated dose and alarm or warning signals can be presented to the user via the user interface, preferably via the display. In an embodiment, an estimated threshold time $e\text{-}t(D_{th})$, i.e. the estimated time for reaching the threshold dose, can be shown to the user, e.g. at the request of the user. The prediction of the time for reaching the dose threshold $D_{th}$ from the accumulated dose AccD(t) at a given point in time $t_{current}$ may be based on extrapolation or linear prediction based on data stored from a start time up to the current point in time (or based on data from a predefined time interval). In an embodiment, data for AccD(t) are determined as a SUM of AccD values for predefined time intervals $\Delta t$ (each sequential time interval $\Delta t$ being assigned a unique number n beginning with n=1 from the start time $t_0$, the current time $t_{current}$ corresponding to a value of n=N), which are stored in a memory, and which can form basis for an extrapolation and determination of an estimated threshold time $e\text{-}t(D_{th})$. In other words the accumulated dose at a given point in time (N) can be expressed as $$AccD(N) = \sum_{n=1}^{N} AccD(\Delta t_n)$$

The double arrowed lines between the user interface (UI) and the dose meter (DM) and the signal processing unit (SPU), respectively, indicate that data can be exchanged between the user interface and these units.

Figure 2B:
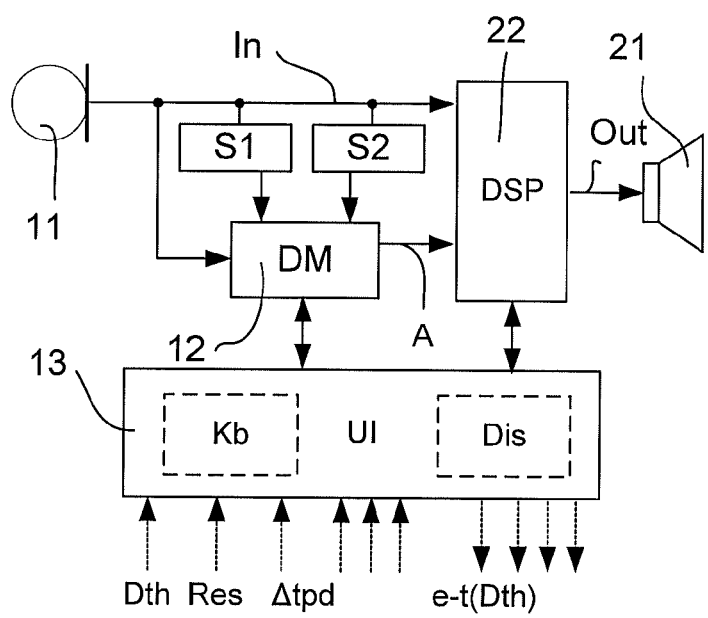

FIG. 2b shows an embodiment of a portable processing system according to the disclosure comprising the same elements as shown and described above in connection with FIG. 2a. It further comprises sensing units S1 and S2. Sensing units S1 and S2 are adapted for evaluating alternative measures of the acoustic environment and for inputting the results of such evaluation for consideration by the dose meter. In a particular embodiment, the system is adapted to provide that the monitored parameters are weighted according to a predefined scheme to determine a risk for overexposure. In an embodiment, the total accumulated dose AccD(Total) is a combination (e.g. a sum, e.g. a weighted sum) of three different dose measures, 1) AccD(Leq) equivalent continuous sound level, 2) AccD(Lpeak) peak measures, and 3) AccD(LdBA) short-term A-weighted levels (LdBA). In an embodiment, a threshold dose $D(Total)_{th}$ of the accumulated total dose is taken to be reached, if at least one of the accumulated doses exceeds its corresponding threshold dose (here if $AccD(Leq) \geq D(Leq)_{th}$, or $AccD(Lpeak) \geq D(Lpeak)_{th}$ or $AccD(LdBA) \geq D(LdBA)_{th}$).

Figure 3:
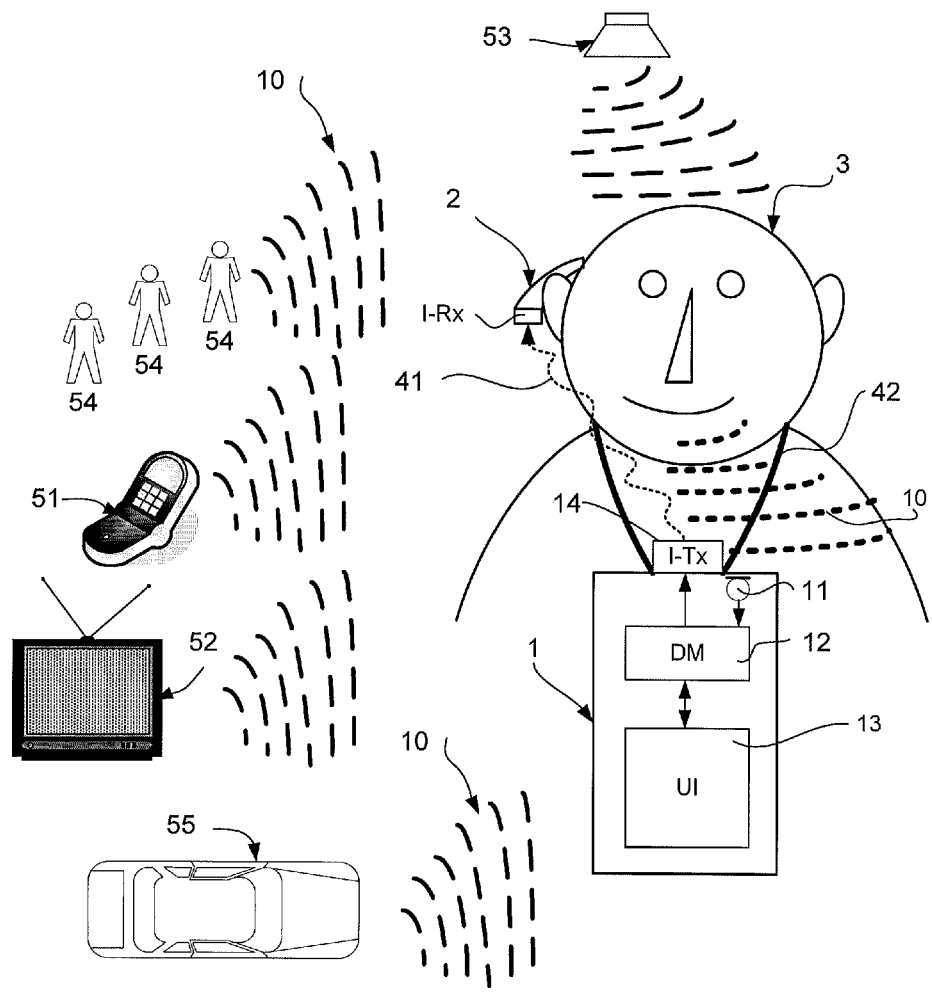
FIG. 3 shows an embodiment of a portable processing system according to the disclosure illustrating various sound sources whose accumulated sound dose is registered in the system.

FIG. 3 shows an embodiment of a portable processing system according to the disclosure illustrating various sound sources whose accumulated sound dose is registered in the system. FIG. 3 is a schematic application scenario for a portable processing system, here embodied in system partitioned in a first neck worn device 1 and a second ear worn device 2. The neck worn device 1 is adapted to be worn around the neck of a user in neck strap 42. The neck worn device 1 comprises a user interface (UI) 13, a dose meter (DM) 12 and a microphone 11. A user may exchange data with the system via user interface 13 as indicated by the double arrowed line between the user interface unit 13 and the dose meter unit 12. The first and second parts of the portable processing system are connected via a wireless link, here indicated as an inductive link, where a signal 41 is transmitted via inductive transmitter I-Tx of the first part 1 to the inductive receiver I-Rx of the second part 2. In the present embodiment, the wireless transmission is based on inductive coupling between coils in the two devices or between a neck loop antenna (e.g. embodied in neck strap 42) distributing the field from a coil in the neck worn device to the coil of the ear worn device (e.g. a hearing instrument). The signal 41 occasionally comprises an alarm signal from the dose meter unit 13, e.g. indicative of the current accumulated dose AccD($t_{current}$) or that a predefined dose threshold $D_{th}$ has been exceeded, etc. The neck worn device 1 may form part of another device, e.g. a mobile telephone or a remote control for the ear worn device 2 or an audio selection device for selecting one of a number of received audio signals and forwarding the selected signal to the device 2 worn on the head 3 of the user, such as at or in the ear (e.g. a listening device, such as a hearing instrument) of the user.

Sources of acoustic signals 10 picked up by microphone 11 of the neck worn device 1 and contributing to the accumulated dose determined by dose meter 12 are exemplified in FIG. 3 by 1) the users own voice, 2) sounds from a telephone 51 (e.g. a mobile telephone), 3) sounds from an entertainment device 52, e.g. a TV set, 4) sounds from other loudspeakers 53, e.g. music at a concert, 5) sounds originating from people 54 in the users environment, e.g. from a crowd at a stadium or in a theatre or entertainment hall or at a party, 5) sounds from traffic in the users environment, e.g. from cars or air-planes passing near a user.

A dosimeter that may be modified and used according to the present disclosure is e.g. described in US 2008/0118087 A1.

An audio selection device, which may be modified and used according to the present disclosure is e.g. described in EP 1 460 769 A1 and in EP 1 981 253 A1.

A mobile telephone that may be modified and used according to the present disclosure is e.g. the Andriod-based (Andriod™ is the Google™ operative system for Mobile Phones) G1 cell phone from T-Mobile, or described in US 2008/0159547 A1.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

Armstrong, J. Scott (ed.), 2001. Principles of forecasting: a handbook for researchers and practitioners. Norwell, Mass.: Kluwer Academic Publishers (2001). ISBN 0-7923-7930-6.
Kopke R D, Jackson R L, Coleman J K, Liu J, Bielefeld E C, Ben J. Balough, 2007. NAC for noise: From the bench top to the clinic. Hearing Research 226: 114-125 (2007).
WO 2008/095013 A1 (PERSONICS HOLDINGS) Aug. 7, 2008
EP 1 460 769 A1 (PHONAK) Sep. 22, 2004
EP 1 981 253 A1 (OTICON) Oct. 15, 2008
US 2008/0159547 A1 (MOTOROLA) Jul. 3, 2008
US 2008/0118087 A1 (SENSIMETRICS) May. 22, 2008

The invention claimed is:

1. A portable processing system adapted for being worn by a user and comprising an input transducer for converting an input sound to an electric input signal, and a signal processing unit adapted for processing an SPU-input signal originating from the electric input signal, wherein the signal processing unit comprises a monitoring part for monitoring and determining an accumulated sound dose AccD in the electric input signal from a start time $t_0$ and for generating an alarm output at a threshold time $t_0+\Delta t_{th}$ when a predefined dose threshold $D_{th}$ is reached, wherein the predefined dose threshold $D_{th}$ is set in relation to a recommended intake of a predefined hearing protecting agent to ensure an intended effect of the hearing protecting agent.

2. A portable processing system according to claim 1 adapted to, at a predefined time $\Delta t_{pd}$ in advance of reaching the predefined dose threshold, estimate said threshold time $t_0+\Delta t_{th}$ and to generate an alarm output at said predefined time $t_0+\Delta t_{th}-\Delta t_{pd}$.

3. A portable processing system according to claim 2 adapted to allow a user to set the predefined time $\Delta t_{pd}$.

4. A portable processing system according to claim 1 adapted to allow a user to reset the start time $t_0$ and set the accumulated sound dose AccD to 0.

5. A portable processing system according to claim 1 adapted to allow a user to set the predefined dose threshold $D_{th}$.

6. A portable processing system according to claim 1 wherein the input transducer is located in a separate device from the signal processing unit, the two devices being wired or wirelessly electrically connected.

7. A portable processing system according to claim 1 adapted to provide that the signal processing unit provides a processed output signal for being presented to the user.

8. A portable processing system according to claim 1 comprising an output transducer for converting a processed electric output signal to an output sound adapted for being presented to a user.

9. A portable processing system according to claim 1 comprising a visual interface for presenting processed information to the user and/or for aiding a user to chose appropriate settings.

10. A portable processing system according to claim 2 adapted to provide that the alarm output is indicative of the estimated time $\Delta t_{pd}$ until a predefined dose threshold $D_{th}$ is reached.

11. A portable processing system according to claim 1 adapted to provide that the currently estimated rest-time until a predefined dose threshold $D_{th}$ is reached can be presented to a user on request.

12. A portable processing system according to claim 1 adapted to provide that other parameters than sound pressure level dose are additionally or alternatively monitored.

13. A portable processing system according to claim 12 adapted to provide that the monitored parameters are weighted according to a predefined scheme to determine a risk for overexposure determining the dose threshold.

14. A portable processing system according to claim 1 comprising a communication device.

15. A portable processing system according to claim 14 comprising an audio selection device and a hearing aid, wherein the input transducer and the monitoring part are situated in the audio selection device.

16. A portable processing system according to claim 14, wherein the communication device is a hearing aid, a headset, an earphone, an active ear protection device, an intermediate device between an audio source and a listening device, or a mobile telephone.

17. A method of using the portable processing system according to claim 1.

18. A method of aiding a person administering a drug for relieving noise induced hearing loss, the method comprising
   a) Providing a portable processing system adapted for being worn by a user and comprising an input transducer for converting an input sound to an electric input signal, and a signal processing unit adapted for processing an SPU-input signal originating from the electric input signal,
   b) Providing a monitoring part for monitoring and determining an accumulated sound dose AccD in the electric input signal from a start time $t_0$ and
   c) Providing that an alarm is generated and presented to the person at a threshold time $t_0+\Delta t_{th}$ when a predefined dose threshold $D_{th}$ is reached,
   d) Providing that the predefined dose threshold $D_{th}$ is set in relation to a recommended intake of a predefined hearing protecting agent to ensure an intended effect of the hearing protecting agent.

19. A method according to claim 18 comprising e) providing—at a predefined time $\Delta t_{pd}$ in advance of reaching the predefined dose threshold—estimating said threshold time $t_0+\Delta t_{th}$ and generating an alarm output to said person at said predefined time $t_0+\Delta t_{th}-\Delta t_{pd}$.

20. A tangible non-transitory computer-readable medium storing a computer program comprising program code means for causing a data processing system to perform the steps of:
   a) providing a monitoring part for monitoring and determining an accumulated sound dose AccD in the electric input signal from a start time t0,
   b) providing that an alarm is generated and presented to a person at a threshold time t0+Δtth when a predefined dose threshold Dth is reached,
   c) providing that the predefined dose threshold Dth is set in relation to a recommended intake of a predefined hearing protecting agent to ensure an intended effect of the hearing protecting agent,
when said computer program is executed on the data processing system.

21. A data processing system comprising a processor and program code means for causing the processor to perform the steps of:
   a) providing a monitoring part for monitoring and determining an accumulated sound dose AccD in the electric input signal from a start time t0,
   b) providing that an alarm is generated and presented to a person at a threshold time t0+Δtth when a predefined dose threshold Dth is reached,
   c) providing that the predefined dose threshold Dth is set in relation to a recommended intake of a predefined hearing protecting agent to ensure an intended effect of the hearing protecting agent.

* * * * *